United States Patent
Dong et al.

(10) Patent No.: US 10,327,379 B2
(45) Date of Patent: Jun. 25, 2019

(54) POT SEEDLING FEEDING SYSTEM FOR TRANSPLANTER

(71) Applicant: Jiangsu University, Jiangsu (CN)

(72) Inventors: Lili Dong, Jiangsu (CN); Jing Luo, Beijing (CN); Li Ma, Jiangsu (CN); Junyi He, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 15/573,891

(22) PCT Filed: Jun. 3, 2016

(86) PCT No.: PCT/CN2016/084681
§ 371 (c)(1),
(2) Date: Nov. 14, 2017

(87) PCT Pub. No.: WO2016/192665
PCT Pub. Date: Dec. 8, 2016

(65) Prior Publication Data
US 2018/0288935 A1    Oct. 11, 2018

(30) Foreign Application Priority Data
Jun. 5, 2015    (CN) .......................... 2015 1 0301247

(51) Int. Cl.
*B65G 23/44*    (2006.01)
*B65G 23/00*    (2006.01)
(Continued)

(52) U.S. Cl.
CPC ................ *A01C 11/02* (2013.01); *A01G 9/00* (2013.01)

(58) Field of Classification Search
None
See application file for complete search history.

(56) References Cited

U.S. PATENT DOCUMENTS

| 5,247,761 A * | 9/1993 | Miles ..................... A01G 9/086 |
| | | 111/104 |
| 5,860,372 A * | 1/1999 | Bouldin ............... A01C 11/025 |
| | | 111/104 |

(Continued)

FOREIGN PATENT DOCUMENTS

| CN | 101180928 | 5/2008 |
| CN | 201491493 | 6/2010 |

(Continued)

*Primary Examiner* — Kavel Singh
(74) *Attorney, Agent, or Firm* — Hartman Global IP Law; Gary M. Hartman; Domenica N. S. Hartman

(57) ABSTRACT

The present invention provides a pot seedling feeding system for a transplanter, including a conveyor unit, a detection sensor, a controller, a seedling separation unit, side plates, and support stands. The conveyor unit includes a step motor, a transmission shaft, a conveyor belt, a tensioning shaft, and bearings. The seedling separation unit includes a seedling separation rod, a reset spring, a guide post, and a support seat. The controller is used to control the step motor which drives the conveyor belt in order to move the pot seedling. When a seedling receiving barrel of the planter rises to a seedling receiving position, the planter is controlled by using a brake cable, the seedling separation rod is then ejected which in turn drives the step motor to carry a pot seedling to move forward. The pot seedling is then dropped in a seedling receiving cup of the planter. In order to improve the quality of pot seedling planting, the seedling separation rod corrects a feeding posture of the pot seedling at the moment when the pot seedling drops. The present invention is about a mechanical seedling feeding system adopting the conveyor unit and the seedling separation unit that move intermittently, where multiple pot seedlings can be placed at a time, so that the operation is simple and fast, labor is saved and the cost is reduced. Stress from missing seedlings and (Continued)

excessive fatigue from repetitive movement are also eliminated from the implementation of this device.

8 Claims, 2 Drawing Sheets

(51) Int. Cl.
*B65G 15/00* (2006.01)
*A01C 11/02* (2006.01)
*A01G 9/00* (2018.01)

(56) References Cited

U.S. PATENT DOCUMENTS 6,006,893 A * 12/1999 Gilmore ................. B65G 67/08
198/588
9,399,555 B2 * 7/2016 Fonnelop ............... B65G 21/06

FOREIGN PATENT DOCUMENTS

| | | |
|---|---|---|
| CN | 102246625 | 11/2011 |
| CN | 103444329 | 12/2013 |
| CN | 104838781 | 8/2015 |
| CN | 104919954 | 9/2015 |
| JP | H05111308 | 5/1993 |
| JP | 2010507377 | 3/2010 |

* cited by examiner

POT SEEDLING FEEDING SYSTEM FOR TRANSPLANTER

TECHNICAL FIELD

This invention relates to an efficient pot seedling feeding system for a transplanter, it is a part of to the technical field of agricultural machinery. This system is applied to a pot seedling transplanter.

BACKGROUND ART

When compared to conventional direct seeding, pot seedling transplanting has the following major advantages: growth periods of vegetables can be shortened, crop arrangement is facilitated, land utilization is improved, and economic income is increased. Transplanted pot seedlings have a strong root system and consistent flowering and maturation, which can facilitate subsequent stages such as management and harvesting. Therefore, plug seedling cultivation and pot seedling transplanting have become increasingly popular among vegetable producers and flower producers. However, because no suitable auxiliary machines are available, plug seedling cultivation and pot seedling transplanting have been labor intensive industries for a long time, where the labor cost accounts for over 50% of the total production cost. Manual transplanting has high labor intensity, and the transplanting quality and work efficiency are so low that large-area transplantation can hardly be implemented. As a consequence, the production scale is small, the production efficiency is low, and the development of related crop production in China is restricted. However the mechanized transplanting can reduce the production cost, improve the work efficiency and transplanting quality. Therefore, there is an urgent need for the development of a system that implements the mechanization of pot seedling transplanting work.

A pot seedling transplanter includes two key systems: a seedling feeding system and a planting system. The purpose of the seedling feeding system is to deliver a pot seedling into a planter. In an existing semi-automatic transplanter, a rotary holding cup structure is usually used for a seedling feeding system. Only one pot seedling can be fed at a time, and operations cannot be discontinuous. As a result, the labor intensity is relatively high and operators become tired easily, so the transplanting speed is relatively slow (the transplanting speed is usually about 40 seedlings per minute). A fully-automatic transplanter has an automatic seedling feeding system, which does not require manual seedling feeding, and has a high transplanting speed. However, the fully-automatic transplanter has a relatively complex mechanism system and a very high cost, it is not suitable for medium-scale and small-scale users. In the invention patent (application No. 201210317407.8) of an automatic seedling picking and feeding mechanism for plug seedling transplanter, an automatic seedling picking and feeding mechanism for plug seedling transplanter was disclosed, including a displacement mechanism, a support stand, a slide rod, a connecting-rod mechanism, and a seedling clamping mechanism. The support stand is installed on the displacement mechanism so as to implement position switching of the support stand between a seedling picking action and a seedling feeding action. One end of the slide rod is inserted in a slide sleeve movable inside a slide groove on the support stand, and the other end of the slide rod is connected to the seedling clamping mechanism. The displacement mechanism is used to implement switching of the seedling clamping mechanism between a seedling picking procedure position and a seedling feeding procedure position. The connecting-rod mechanism is used to control the rotation of the slide rod and the seedling clamping mechanism and implement closing and opening of a seedling clamp. The apparatus has a relatively complex structure and a relatively high production cost, and the seedling clamping mechanism of the apparatus cannot precisely position a pot seedling in a seedling clamping process, which results in the loss of seedlings. In the invention patent (application No. 2011101335051) of a mechanical seedling feeding transplanter, a mechanical seedling feeding mechanism which can replace manual operation is disclosed. Multiple pot seedlings can be placed into a mechanical seedling feeding system each time, with the control of electric-control system, the seedling feeding mechanism can drop seedlings automatically by using delivery cups. Thereby this mechanism improves the speed and efficiency of transplanting work, meanwhile the production cost is reduced. However, the seedling feeding mechanism has a complex design and a relatively large quantity of parts.

SUMMARY OF THE INVENTION

In view of the major technical deficiencies and defects in existing seedling feeding systems for transplanters, this present invention provides a pot seedling feeding system for a transplanter by adopting a conveyor unit and a seedling separation unit that move intermittently, where operations of the system are simple and fast, and multiple pot seedlings can be placed at a time. The labor intensity and nervousness of workers can be reduced, time saving and labor saving are implemented, and at the same time the efficiency and quality of mechanical seedling feeding are improved.

The technical solution of the present invention is as follows:

An efficient pot seedling feeding system for a transplanter includes: a conveyor unit for a pot seedling to be placed therein and transferred, a controller for driving a motor, side plates facilitating placement and transfer of a pot seedling, and support stands for mounting the seedling feeding system at a transplanter. The conveyor unit of the system includes a step motor, a transmission shaft, a conveyor belt, a tensioning shaft, and bearings. The step motor is linked to the transmission shaft. The tensioning shaft and the transmission shaft keep the conveyor belt in a tensioned state. The conveyor unit is driven by using the step motor, where the transmission shaft and the conveyor belt move to transfer a pot seedling. The system also includes a seedling separation unit for separating seedlings and correcting the feeding posture of a pot seedling and a detection sensor for detecting whether a pot seedling reaches a seedling separation position. The seedling separation unit contains a seedling separation rod, a support seat, a reset spring, an adjustment plate, a guide post, a brake cable, and a sleeve tube. The seedling separation rod and the guide post are connected to the adjustment plate, they pass through the guide holes on the support seat, the seedling separation rod and its guide hole are the sliding fit, and the guide post and its guide hole are the sliding fit too. The support seat is secured on the side plate by using a bolt or through welding.

In the pot seedling feeding system for a transplanter provided in the present invention, the detection sensor for detecting whether a pot seedling is in proper position inside the system is connected on the side plate at a pot seedling pre-feeding position. It then sends an instruction to the controller to run or stop the step motor. When the sensor does not detect a pot seedling, it sends an instruction to run the step motor to transfer a pot seedling to the side of the seedling separation rod at the pre-feeding position to wait for seedling feeding. When the sensor detects that a pot seedling reaches the pre-feeding position beside the seedling separation rod or a pot seedling exists at the pre-feeding position, it sends an instruction to stop the step motor, to prevent the pot seedling from being damaged due to running of the conveyor belt.

The pot seedling feeding system for a transplanter provided in the current invention, the conveyor unit allows an operator to place multiple pot seedlings simultaneously, so as to relieve excessive fatigue caused by frequent repetitive actions. The step motor of the conveyor unit is replaceable with a servo motor or a numerically controlled hydraulic motor.

The pot seedling feeding system for a transplanter provided in the current invention, the seedling separation unit is mounted on the side plate at a relatively low end of the conveyor unit. The brake cable of the seedling separation unit is controlled by a planter. When a seedling receiving barrel of the planter moves to a seedling receiving position under the seedling separation rod, the planter is controlled by using the brake cable, the seedling separation rod is ejected, and at the same time drives the step motor to drive the conveyor belt to carry a pot seedling to move forward. The mechanical control for the seedling feeding action of the seedling separation rod by the brake cable and the sleeve tube is replaceable with an electrical control.

In the pot seedling feeding system for a transplanter, control for the movement of the seedling separation rod is directly controlled from a planter. It is controlled by the planter by using the brake cable and the sleeve tube mentioned in this invention, or by indirect control that is implemented according to movement of the planter through coordination and matching calculation. The controller of the step motor receives a control signal from the detection sensor and also receives a control signal from the seedling separation unit. The conveyor unit may allow the operator to place multiple pot seedlings simultaneously, so as to avoid excessive fatigue caused by frequent repetitive actions during manual direct seedling feeding.

The control structure of the brake cable of the seedling separation unit in the pot seedling feeding system for a transplanter provided in this invention is as follows: the brake cable is located between the guide post and the seedling separation rod. The guide post and the seedling separation rod are equipped with guide holes on the support seat in a slide guide manner, where gaps cannot be excessively large or small. The seedling separation rod is able to move freely in the guide hole in an axial direction, to ensure free ejection and reset of the seedling separation rod. The seedling separation unit is mounted at a relatively low end of the conveyor unit. The brake cable of the seedling separation unit is controlled by a planter. When a seedling receiving barrel of the planter moves to a seedling receiving position under the seedling separation rod, the planter is controlled by using the brake cable, the seedling separation rod is then ejected, and at the same time the step motor is used to drive the conveyor belt to carry a pot seedling to move forward. When moving to the end of the conveyor belt, the pot seedling is fed in a seedling receiving cup of the planter under the effect of gravity. The exact moment when the pot seedling is dropped, the ejected seedling separation rod further corrects a feeding posture of the pot seedling, so as to facilitate implementation of a seedling feeding action and improve quality of pot seedling transplanting.

The pot seedling feeding system for a transplanter provided in this invention, the seedling separation rod is controlled by the planter by using the brake cable and the sleeve tube, or we can say that it is also controlled according to movement of the planter through coordination and matching calculation. The dropping-seedlings action of the pot seedling feeding system for a transplanter is controlled by the step motor and the detection sensor, and is controlled by the seedling separation rod simultaneously, so as to avoid nervous tension of an operator over seedling missing during direct seedling feeding.

The pot seedling feeding system for a transplanter provided in this invention, two, three or more pot seedling feeding systems can be used in parallel in a transplanter, to implement a multi-row simultaneous transplanting of pot seedlings.

A pot seedling feeding mechanism for a transplanter includes the pot seedling feeding system provided in this invention.

Compared with the prior art, the present invention has the following benefits: the structure is simple, the operation is convenient, and the cost is reduced; multiple pot seedlings can be placed at a time, so as to avoid excessive fatigue caused by frequent repetitive actions of an operator during direct seedling feeding and nervous tension over seedling missing; the labor intensity is reduced; the transplanting efficiency and transplanting quality are improved, and the basis is provided for automatic transplanting.

Figure 1:
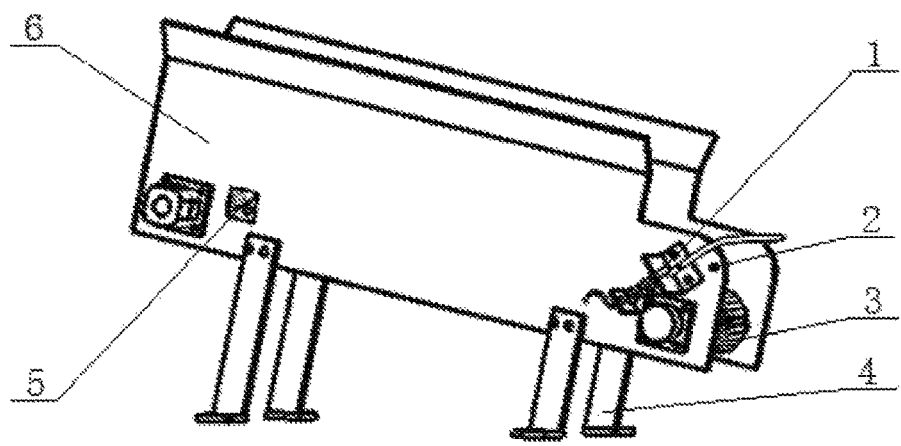
FIG. 1: Schematic structural view of a pot seedling feeding system for a transplanter.

In the drawings: 1. seedling separation unit; 1-1. seedling separation rod; 1-2. support seat; 1-3. reset spring; 1-4. adjustment plate; 1-5. guide post; 1-6. brake cable; 1-7. sleeve tube; 2. detection sensor; 3. conveyor unit; 3-1. conveyor belt; 3-2. bearing; 3-3. tensioning shaft; 3-4. transmission shaft; 3-5. step motor; 4. support stand; 5. controller; and 6. side plate.

DETAILED DESCRIPTION OF THE EMBODIMENTS

The structure, functionality, and processing of the current invention are further described below with reference to the accompanying drawings.

FIG. 1 is a schematic structural view of a pot seedling feeding system for a transplanter for this invention. The system includes a conveyor unit 3 for a pot seedling to be transferred, side plates 6 facilitating placement of a pot seedling, and support stands 4 for mounting a seedling feeding system on the transplanter. The system has a seedling separation unit 1 used for separating seedlings and correcting a feeding posture of a pot seedling and a detection sensor 2 that detects whether a pot seedling reaches a seedling separation position. The system also includes a controller 5 which drives a step motor. The controller 5 can receive signals from the detection sensor 2, and also from the seedling separation unit 1, so as to avoid nervous tension of an operator over seedling missing during direct seedling feeding.

Figure 2:
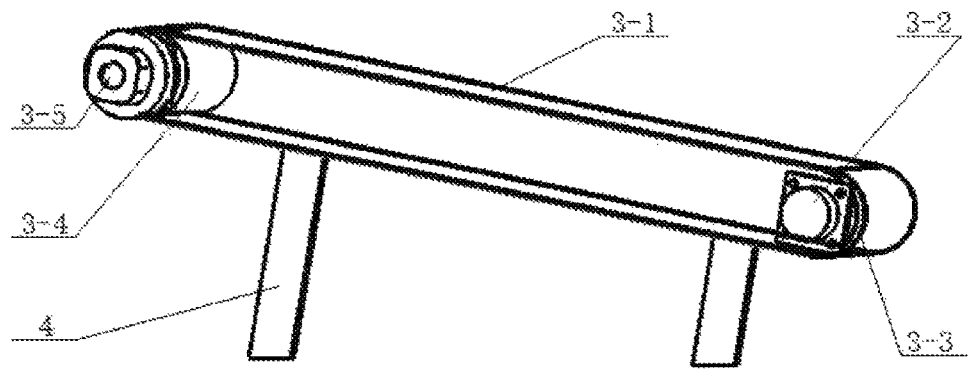
FIG. 2: Schematic structural view of a conveyor unit of the pot seedling feeding system.

FIG. 2 is a structural view of a conveyor unit of the pot seedling feeding system. The conveyor unit 3 has a step motor 3-5, a transmission shaft 3-4, a conveyor belt 3-1, a tensioning shaft 3-3, and bearings 3-2. The step motor 3-5 is linked to the transmission shaft 3-4. The conveyor belt 3-1 is mounted on the transmission shaft 3-4 and the tensioning shaft 3-3. Both ends of the transmission shaft 3-4 and both ends of the tensioning shaft 3-3 are mounted on the side plates 6 on both sides with the use of bearings 3-2. The step motor 3-5 may drive, by using the transmission shaft 3-4 and the conveyor belt 3-1, a pot seedling to move. The step motor 3-5 is replaceable with a servo motor or a numerically controlled hydraulic motor. The conveyor unit 3 has a simple structure, and may allow an operator to place multiple pot seedlings at a time conveniently, so as to relieve excessive fatigue caused by frequent repetitive actions.

Figure 3:
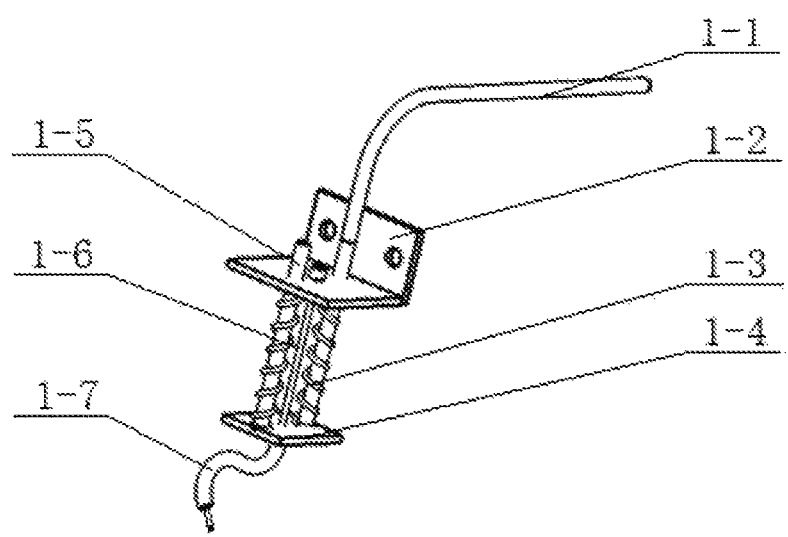
FIG. 3: Schematic structural view of a seedling separation unit of the pot seedling feeding system.

FIG. 3 is a structural view of the seedling separation unit 1 for the pot seedling feeding system. The seedling separation unit 1 has a seedling separation rod 1-1, a support seat 1-2, a reset spring 1-3, an adjustment plate 1-4, a guide post 1-5, a brake cable 1-6, and a sleeve tube 1-7. The seedling separation rod 1-1 and the guide post 1-5 are connected separately to the adjustment plate 1-4 by using a bolt or with welding; it passes through the guide holes on the support seat 1-2, and are axially fitted with the guide holes. The entire seedling separation unit 1 is connected on the side of plate 6 by using the support seat 1-2, and bolt link or a welded joint may be used for the fixed connection between the support seat 1-2 and the side plate 6.

The brake cable 1-6 of the seedling separation unit 1 is located in the middle of the guide post 1-5 and the seedling separation rod 1-1, to facilitate the implementation of a seedling separation action. The seedling separation action of the seedling separation rod 1-1 is controlled by a planter by using the brake cable 1-6 and the sleeve tube 1-7, or it is controlled according to movement of the planter through coordination and matching calculation. When being ejected for seedling separation, the seedling separation rod 1-1 further corrects a feeding posture of a pot seedling that is about to be fed in a seedling guiding barrel of the planter, thereby improving the quality of pot seedling transplanting. The mechanical control on a seedling feeding action of the seedling separation rod 1-1 by the brake cable 1-6 and the sleeve tube 1-7 is replaceable with electronic control.

The seedling feeding process for the pot seedling feeding system of the transplanter is carried out according to the following steps:

a) First, the operator places multiple pot seedlings on the conveyor belt 3-1 of the conveyor unit 3 at a time. The detection sensor 2 sends detection information to the controller 5, to further drive the motor 3-5, by using the transmission shaft 3-4 and the conveyor belt 3-1, the pot seedlings enter a pre-feeding position in front of a seedling stop rod. In this case, the detection sensor 2 detects the pot seedlings and sends information to the controller 5, so that the controller 5 stops the motor 3-5.

b) Second, when a planter of the transplanter travels to a seedling receiving position under the seedling separation rod 1-1, the brake cable 1-6 is retracted, and the seedling separation rod 1-1 is ejected under the effect of the sleeve tube 1-7 and the guide post 1-5. At the same time, information is sent to the controller 5 to rotate the step motor 3-5 over the position of one pot seedling. A pot seedling located at the pre-feeding position and the end of the conveyor belt 3-1 is moved forward under the effect of the conveyor belt 3-1, and drops in a seedling receiving cup of the planter under the effect of gravity, thereby implementing seedling feeding. At that moment when the pot seedling is dropped, the ejected seedling separation rod 1-1 corrects a feeding posture of the pot seedling by blocking the stem and leaves of the pot seedling, thereby improving the quality of pot seedling transplanting.

c) Third, after the planter of the transplanter receives the seedling and travels to the seedling receiving position, the brake cable 1-6 is released, and the seedling separation rod 1-1 is reset under the effect of the reset spring 1-3, until the planter travels to the seedling receiving position under the seedling separation rod 1-1 again. In this case, the detection sensor 2 detects the pot seedling and sends information to the controller 5, to stop the motor 3-5 and wait for the next time of seedling feeding. At this point, the seedling feeding system makes one complete cycle of pot seedling feeding, and starts a new cycle.

d) Finally, after the operator places a last group of pot seedlings on the conveyor unit 3, the operator then prepares another group of pot seedlings, and waits for an opportunity to place this group of pot seedlings on the conveyor belt 3-1 of the conveyor unit 3, this ensures the pot seedlings to be transplanted continuously. According to the foregoing order, mechanical and continuous seedling feeding of the pot seedling feeding system for a transplanter is implemented.

The embodiments are preferably implementation manners of this present invention; however, this present invention includes but not limited to the foregoing implementation manners, any obvious improvements, replacements or variations that can be made by a person skilled in the art without departing from the substantial content of the present invention fall within the protection scope of the present invention.

The invention claimed is:

1. A pot seedling feeding system for a transplanter, comprising:

a conveyor unit for placing and transferring multiple individual pot seedlings, a controller for driving a motor to run, side plates facilitating placement and transfer of the multiple individual pot seedlings, and support stands for mounting the seedling feeding system on a transplanter, wherein the conveyor unit of the system is comprised of a step motor, a transmission shaft, a tensioning shaft, a conveyor belt mounted on the transmission shaft and the tensioning shaft, and bearings, the step motor is linked to the transmission shaft, the tensioning shaft and the transmission shaft keep the conveyor belt in a tensioned work state, the conveyor unit is driven by the step motor, wherein the transmission shaft and the conveyor belt move to transfer the multiple individual pot seedlings, and the controller of the system is adapted to control the step motor of the conveyor unit; wherein:

the system also contains a seedling separation unit for separating the multiple individual pot seedlings and correcting a feeding posture of each individual pot seedling of the multiple individual pot seedlings, and a detection sensor for detecting whether an individual pot seedling of the multiple individual pot seedlings reaches the seedling separation position;

the seedling separation unit comprises a seedling separation rod, a support seat, a reset spring, an adjustment plate, a guide post, a brake cable, and a sleeve tube; and the seedling separation rod and the guide post are connected to the adjustment plate with a bolt or a welded joint, passing through guide holes on the support seat, the seedling separation rod and the guide post having sliding fits with the guide holes, and the support seat is securely connected on the side plate with a bolt or a welded joint.

2. The pot seedling feeding system for a transplanter according to claim 1, wherein the detection sensor for detecting whether an individual pot seedling of the multiple individual pot seedlings is in position in the system is connected to the side plate at a pot seedling pre-feeding position, and sends an instruction to the controller to run or to stop the step motor;

when the sensor does not detect an individual pot seedling, the sensor sends an instruction to run the step motor in order to transfer a pot seedling of the multiple individual pot seedlings to the seedling separation rod at the pre-feeding position to wait for seedling feeding;

when the sensor detects that a pot seedling of the multiple individual pot seedlings reaches the pre-feeding position, or a pot seedling of the multiple individual pot seedlings exists at the pre-feeding position, the sensor sends an instruction to stop the step motor to prevent the pot seedling from being damaged due to running of the conveyor belt.

3. The pot seedling feeding system for a transplanter according to claim 1, wherein the conveyor unit enables an operator to place the multiple individual pot seedlings simultaneously, so as to relieve excessive fatigue caused by frequent repetitive actions; and the step motor of the conveyor unit is replaceable with a servo motor or a numerically controlled hydraulic motor.

4. The pot seedling feeding system for a transplanter according to claim 1, wherein the seedling separation unit is mounted on the side plate at a relatively low end of the conveyor unit, the brake cable of the seedling separation unit is controlled by a planter, when a seedling receiving barrel of the planter moves to a seedling receiving position under the seedling separation rod, the planter is controlled by using the brake cable, the seedling separation rod is ejected, and at the same time the step motor drives the conveyor belt to carry the multiple individual pot seedlings to move forward, and the mechanical control on a seedling feeding action of the seedling separation rod by the brake cable and the sleeve tube is replaceable with electronic control.

5. The pot seedling feeding system for a transplanter according to claim 1, wherein the brake cable is in the middle of the guide post and the seedling separation rod, both the seedling separation rod and the guide post have a sliding fit with the guide hole on the support seat;

clearance between the guide post and the seedling separation rod and the guide holes enables free axial movement of the guide post and the seedling separation rod, free ejection and reset of the seedling separation rod, and smooth realization of the feeding action;

when feeding the multiple individual pot seedlings, the seedling separation rod corrects a drop posture of each individual pot seedling of the multiple individual pot seedlings that will be falling into the seedling receiving barrel, so as to improve the quality of pot seedling transplanting.

6. The pot seedling feeding system for a transplanter according to claim 1, wherein the seedling separation rod is controlled by the planter by using the brake cable and the sleeve tube, or it is controlled according to movement of the planter through coordination and matching calculation;

the pot seedling feeding of the pot seedling feeding system for a transplanter is controlled by the step motor by using the detection sensor, or is also controlled by the seedling separation rod at the same time, so as to avoid nervous tension of an operator over a pot seedling missing during direct seedling feeding.

7. The pot seedling feeding system for a transplanter according to claim 1, wherein two, three or more pot seedling feeding systems are capable of being used in parallel in a transplanter, to implement multi-row simultaneous transplanting of pot seedlings.

8. A pot seedling feeding mechanism for a transplanter, comprising the pot seedling feeding system according to claim 1.

* * * * *